(12) United States Patent
Simpson et al.

(10) Patent No.: US 7,130,400 B2
(45) Date of Patent: Oct. 31, 2006

(54) GRAPHICAL ANIMATION AND SOUND FOR INTERNET CALL-WAITING MESSAGES

(75) Inventors: Anita Hogans Simpson, Decatur, GA (US); John L. Bradberry, Jonesboro, GA (US); Linda A. Roberts, Decatur, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 677 days.

(21) Appl. No.: 10/134,114

(22) Filed: Apr. 27, 2002

(65) Prior Publication Data

US 2004/0109551 A1 Jun. 10, 2004

(51) Int. Cl.
*H04M 1/56* (2006.01)
(52) U.S. Cl. ............ 379/142.08; 379/215.01; 379/373.03
(58) Field of Classification Search .......... 379/215.01, 379/88.17, 93.25, 201.01, 88.12, 58.12, 88.13, 379/142.08, 373.02, 374.02, 142.01, 373.03; 370/352
See application file for complete search history.

(56) References Cited

U.S. PATENT DOCUMENTS

| | | | |
|---|---|---|---|
| 5,805,587 A | 9/1998 | Norris et al. | |
| 5,946,386 A * | 8/1999 | Rogers et al. | 379/265.09 |
| 6,078,581 A | 6/2000 | Shtivelman et al. | |
| 6,253,249 B1 | 6/2001 | Belzile | |
| 6,259,692 B1 | 7/2001 | Shtivelman et al. | |
| 6,714,637 B1 * | 3/2004 | Kredo | 379/215.01 |

\* cited by examiner

*Primary Examiner*—Fan Tsang
*Assistant Examiner*—Olisa Anwah
(74) *Attorney, Agent, or Firm*—Walters & Zimmerman; Geoff Sutcliffe; Todd Mitchem

(57) ABSTRACT

Methods and systems are disclosed for selecting the content of Internet Call-Waiting messages. One method includes providing a selection of content for an Internet Call-Waiting message and allowing a customer/user to select the content of the Internet Call-Waiting message. The customer/user may select graphics, animation, and sound to accompany the Internet Call-Waiting message. Once the content is selected, the customer/user may then associate the content with a telephone number.

19 Claims, 11 Drawing Sheets

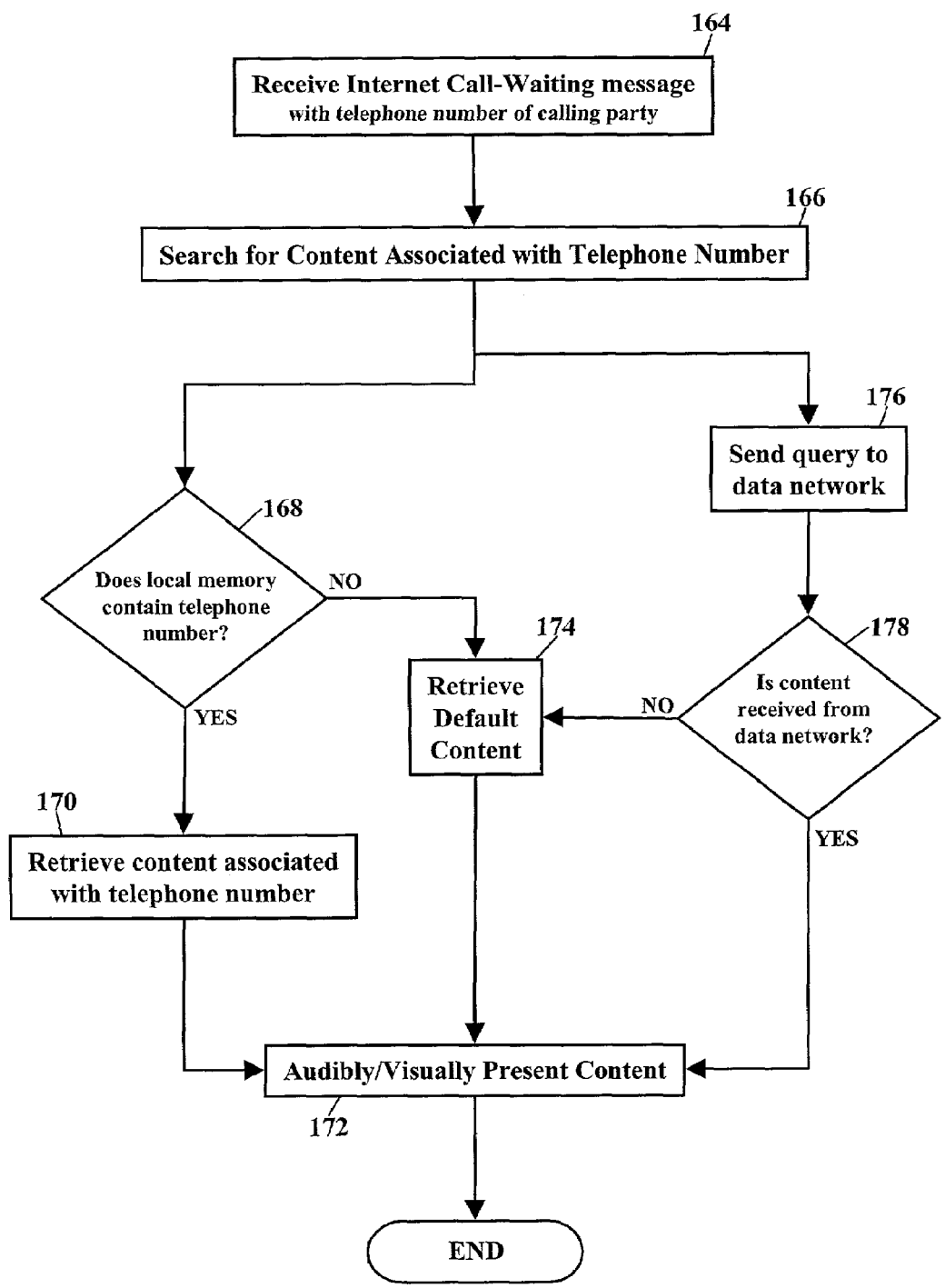

GRAPHICAL ANIMATION AND SOUND FOR INTERNET CALL-WAITING MESSAGES

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but the copyright owner otherwise reserves all copyrights whatsoever.

BACKGROUND OF THE INVENTION

1. Field of the Invention

This invention generally relates to computers and telephony and, more particularly, to methods and systems for allowing a subscriber to select graphics, animation, and sounds to accompany Internet Call-Waiting message notifications.

2. Description of the Related Art

Internet Call-Waiting messages alert a user of an incoming call. When a telephone customer establishes a dial-up connection to a data network, such as the Internet, the customer's telephone line assumes a busy status. If a caller places a call to the customer, the caller ordinarily receives a "busy" signal. If, however, the customer subscribes to an Internet Call-Waiting service, the customer will receive a notification of the incoming call. This notification, typically termed an "Internet Call-Waiting Message," is displayed on the customer's computer video display and alerts the computer-using customer of the incoming call. The notification often identifies the calling telephone number and, perhaps, the listed name of the telephone number. The computer-using customer then has the option of terminating the dial-up Internet connection and accepting the incoming call.

These Internet Call-Waiting messages, however, are generic in appearance. Internet Call-Waiting messages have the same "look and feel" regardless of the calling party. Internet Call-Waiting messages display a generic graphical user interface. These generic graphical user interfaces display the telephone number of the calling party and the listed name of the calling party. The generic graphical user interface also displays an interactive button or "control" that allows the subscriber to accept the incoming call. The subscriber places a cursor on the button, "clicks" the button, and the dial-up Internet connection is terminated. The generic graphical user interface may also display a button control for sending the call into voicemail, a button control that forwards the call to another telephone number, or a button control for placing the incoming call in a "hold" status. These button controls, along with the telephone number and the listed name of the calling party, are the content of current Internet Call-Waiting messages. Subscribers to the Internet Call-Waiting service have no options to alter or to personalize this content.

There is, accordingly, a need in the art for varying the appearance of Internet Call-Waiting messages, a need for subscribers to quickly and easily personalize Call-Waiting messages, a need for an enhanced Internet Call-Waiting client platform that appeals to subscribing customers, and a need for an Internet Call-Waiting client that is easily implemented by service providers.

BRIEF SUMMARY OF THE INVENTION

The aforementioned problems are reduced by an Internet Call-Waiting Client Module. The Internet Call-Waiting Client Module comprises computer programs, computer systems, and telecommunications systems that allow a subscribing customer/user to select graphics, animation, and sounds to accompany Internet Call-Waiting messages. One embodiment of this invention describes a method that provides Internet Call-Waiting service to a customer. The subscribing customer/user is provided with a selection of content to accompany the Internet Call-Waiting message. The term "content" may include a selection of graphics to accompany the Internet Call-Waiting message, a selection of animation to accompany the Internet Call-Waiting message, and a selection of sounds to accompany the Internet Call-Waiting message. The subscribing customer/user is then allowed to select their desired content for the Internet Call-Waiting message. The Internet Call-Waiting Client Module then allows the subscribing customer/user to associate their desired content to a telephone number. The subscribing customer/user may thus select unique content for each telephone number. This invention thus permits a user (also referred to as a subscriber or a customer) to easily and to quickly personalize the appearance of Internet Call-Waiting messages. Because this invention permits personalizing Internet Call-waiting messages, this invention will appeal to customers and provide added revenue to service providers. This invention may also be downloaded to the user from a server, so this invention is also easy to implement by service providers Another aspect of this invention describes another method. This method provides a selection of content for an Internet Call-Waiting message. The content, for example, may include a selection of graphics, a selection of animation, and a selection of sounds to accompany the Internet Call-Waiting message. The user may even be permitted to browse computer memory, or a data network, for the desired content. The user is allowed to select their desired content for the Internet Call-Waiting message. This embodiment may also permit the user to preview the Internet Call-Waiting message containing the desired content. The user may also associate the desired content with a telephone number. The user may thus select different content for an Internet Call-Waiting message received from each telephone number.

The user may also associate content with groupings and with categories. The user, as previously mentioned, can associate content with a telephone number. The user, however, can also associate content with groups of telephone numbers and with categories of telephone numbers. The user, for example, could associate common content with all telephone numbers in a "business" category. The user, likewise, can associate content with "family," "personal," "kid's friends," "mom's friends" and any other category of telephone numbers. If the user maintains an electronic address book, the Internet Call-Waiting Client Module can also associate graphics, animation, and sounds to the categories of telephone numbers maintained in the address book.

Still another aspect of the present invention describes a system. This system comprises a processor and an Internet Call-Waiting Client Module stored in memory. The Internet Call-Waiting Client Module presents a selection of content for an Internet Call-Waiting message. The content, for example, may include a selection of graphics to accompany the Internet Call-Waiting message, a selection of animation to accompany the Internet Call-Waiting message, and a selection of sounds to accompany the Internet Call-Waiting message. The Internet Call-Waiting Client Module allows a user to select their desired content for the Internet Call-Waiting message. The processor is capable of processing the desired content and of presenting the desired content with the Internet Call-Waiting message.

BRIEF DESCRIPTION OF THE SEVERAL VIEWS OF THE DRAWINGS

These and other features, aspects, and advantages of the present invention are better understood when the following Detailed Description of the Invention is read with reference to the accompanying drawings, wherein:

FIG. 11 is a flowchart describing still another embodiment of providing content for Internet Call-Waiting messages.

DETAILED DESCRIPTION OF THE INVENTION

Figure 1:
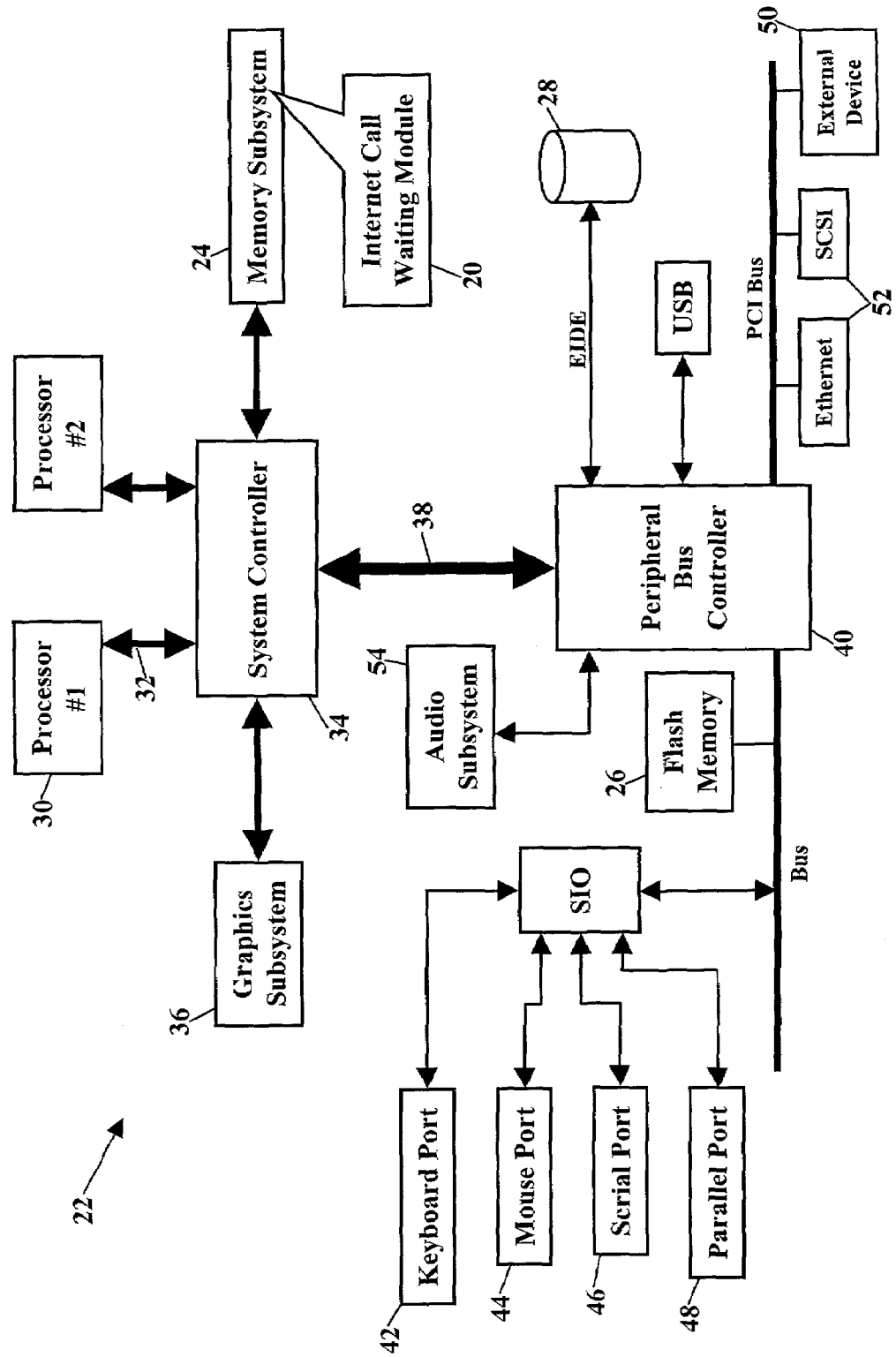
FIG. 1 is a block diagram showing the Internet Call-Waiting Client Module residing in a computer system.
Figure 2:
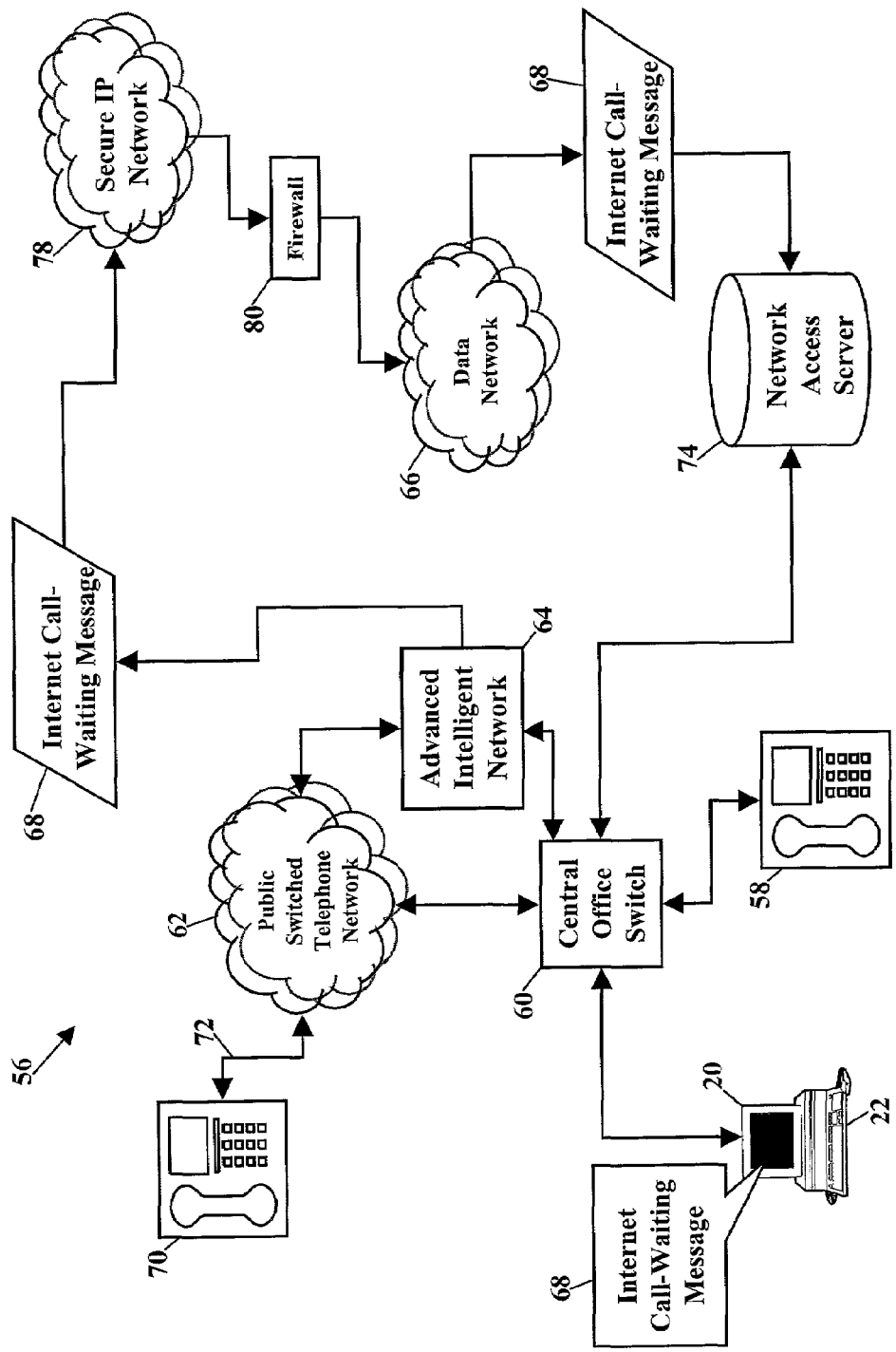
FIG. 2 is a schematic diagram of a telecommunications system.

FIGS. 1 and 2 depict possible operating environments for an embodiment of the present invention. This embodiment of an Internet Call-Waiting Client Module 20 comprises a computer program that allows a subscribing customer/user to select graphics, animation, and sound for Internet Call-Waiting messages. When an Internet Call-Waiting message is received, the Internet Call-Waiting message is presented with the desired graphics, animation, and/or sound. As those of ordinary skill in the art of computer programming recognize, computer processes/programs are depicted as process and symbolic representations of computer operations. Computer components, such as a central processor, memory devices, and display devices, execute these computer operations. The computer operations include manipulation of data bits by the central processor, and the memory devices maintain the data bits in data structures. The process and symbolic representations are understood, by those skilled in the art of computer programming, to convey the discoveries in the art.

FIG. 1 is a block diagram showing the Internet Call-Waiting Client Module 20 residing in a computer system 22. The Internet Call-Waiting Client Module 20 operates within a system memory device. The Internet Call-Waiting Client Module 20, for example, is shown residing in a memory subsystem 24. The Internet Call-Waiting Client Module 20, however, could also reside in flash memory 26 or peripheral storage device 28. The computer system 22 also has one or more central processors 30 executing an operating system. The operating system, as is well known, has a set of instructions that control the internal functions of the computer system 22. A system bus 32 communicates signals, such as data signals, control signals, and address signals, between the central processor 30 and a system controller 34 (typically called a "Northbridge"). The system controller 34 provides a bridging function between the one or more central processors 30, a graphics subsystem 36, the memory subsystem 24, and a PCI (Peripheral Controller Interface) bus 38. The PCI bus 38 is controlled by a Peripheral Bus Controller 40. The Peripheral Bus Controller 40 (typically called a "Southbridge") is an integrated circuit that serves as an input/output hub for various peripheral ports. These peripheral ports could include, for example, a keyboard port 42, a mouse port 44, a serial port 46 and/or a parallel port 48 for a video display unit, one or more external device ports 50, and networking ports 52 (such as SCSI or Ethernet). The Peripheral Bus Controller 40 could also include an audio subsystem 54. Those of ordinary skill in the art understand that the program, processes, methods, and systems described in this patent are not limited to any particular computer system or computer hardware.

Those of ordinary skill in the art also understand the central processor 30 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described in this patent are not limited to any particular manufacturer's central processor.

The preferred operating system is WINDOWS® (WINDOWS® is a registered trademark of Microsoft Corporation, One Microsoft Way, Redmond Wash. 98052-6399, 425.882.8080, www.Microsoft.com). Other operating systems, however, are also suitable. Such other operating systems would include the UNIX® operating system (UNIX® is a registered trademark of the Open Source Group, www.opensource.org), the UNIX-based Linux operating system, WINDOWS NT®, and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described in this patent are not limited to any particular operating system.

The system memory device (shown as memory subsystem 24, flash memory 26, or peripheral storage device 28) may also contain an application program. The application program cooperates with the operating system and with a video display unit (via the serial port 46 and/or the parallel port 48) to provide a Graphical User Interface (GUI). The Graphical User Interface typically includes a combination of signals communicated along the keyboard port 42 and the mouse port 44. The Graphical User Interface provides a convenient visual and/or audible interface with a user of the computer system 22.

FIG. 2 is a schematic diagram of a telecommunications system 56. This telecommunications system 56 further represents an operating environment for the Internet Call-Waiting Client Module 20. The Internet Call-Waiting Client Module 20 is shown operating within the memory (such as memory subsystem 24, flash memory 26, or peripheral storage device 28 shown in FIG. 1) of the computer system 22. The Internet Call-Waiting Client Module 20 could alternatively operate with the memory of an Internet Protocol (IP) phone 58. The telecommunications system 56 includes the familiar central office switch 60 of the Public Switched Telephone Network 62 and Advanced Intelligent Network (AIN) componentry 64 controlling many features of the central office switch 60. The telecommunications system 56 may also interface with a data network 66. The interactions between the central office switch 60, the Public Switched Telephone Network 62, the Advanced Intelligent Network 64, and the data network 66, however, are well understood and will only be simply described. If a reader desires a more detailed explanation, the reader is directed to U.S. Pat. No. 5,430,719 issued to Weisser (Jul. 4, 1995) and to U.S. Pat. No. 5,917,817 issued to Dunn et al. (Jun. 29, 1999).

FIG. 2 illustrates the generation of an Internet Call-Waiting message 68. The Internet Call-Waiting message 68 is generated when the called station has an already-established connection to the data network 66 over a telephone line. The term "calling station" shall hereinafter refer to both the calling party and the calling telephonic equipment. The term "called station" shall hereinafter refer to both the called party and to the terminal equipment of the called party. Because the called station has an established connection to the data network 66, the term "called station" would include the computer system 22 connected to the data network 66. The term "called station" would also include the Internet Protocol phone 58. The Internet Call-Waiting feature, however, is known and will only be simply described. If a reader desires a more detailed explanation, the reader is directed to U.S. Pat. No. 5,805,587, issued to Norris et al. (Sep. 8, 1998).

As FIG. 2 shows, the calling station places a call using a communication device. As those of ordinary skill in the art of telephony understand, the communication device could be a common telephone or a wireless device. FIG. 2, for simplicity, routes the call from a telephone 70, along a landline 72, and into the Public Switched Telephone Network 62. If, on the other hand, the calling station is a wireless device, the call is wirelessly coupled to an antenna (not shown), then coupled to a mobile switch (also not shown), and then routed into the Public Switched Telephone Network 62. The Public Switched Telephone Network 62 routes the call to the local central office switch 60 serving the called station.

The called station, however, has an established connection to the data network 66. The computer system 22, for example, is connected to the data network 66 (most commonly the Internet distributed computing network) via a connection to a network access server 74. This network access server 74 provides access to the data network 66. Because the called station has, therefore, a "busy" status, the calling station would ordinarily receive a busy signal. If, however, the called station subscribes to a call-waiting feature, the Advanced Intelligent Network (AIN) suspends the call and the Internet Call-Waiting message 68 is generated. This Internet Call-Waiting message 68 is packetized and sent along a secure Internet Protocol network 78, through a firewall 80 limiting access to the secure Internet Protocol network 78, and then routed into the data network 66. The Internet Call-Waiting message 68 is targeted to the Internet Protocol address of the calling station. The Internet Call-Waiting message 68 routes through the local central office switch 60 and is delivered to the called station (shown as the computer system 22). This Internet Call-Waiting message 68 usually contains the telephone number of the calling station. The called station, such as the computer system 22, then receives the Internet Call-Waiting message 68 and displays the Internet Call-Waiting message 68 to the user. The Internet Call-Waiting message 68 is a notification that alerts the user of the incoming call. Because the Internet Call-Waiting message 68 includes the telephone number of the calling station, the Internet Call-Waiting message 68 notification typically displays the telephone number of the calling station. The user may then terminate the connection to the data network 66 and accept the telephone call. The user could alternatively decline the incoming call and maintain the connection to the data network.

Figure 3:
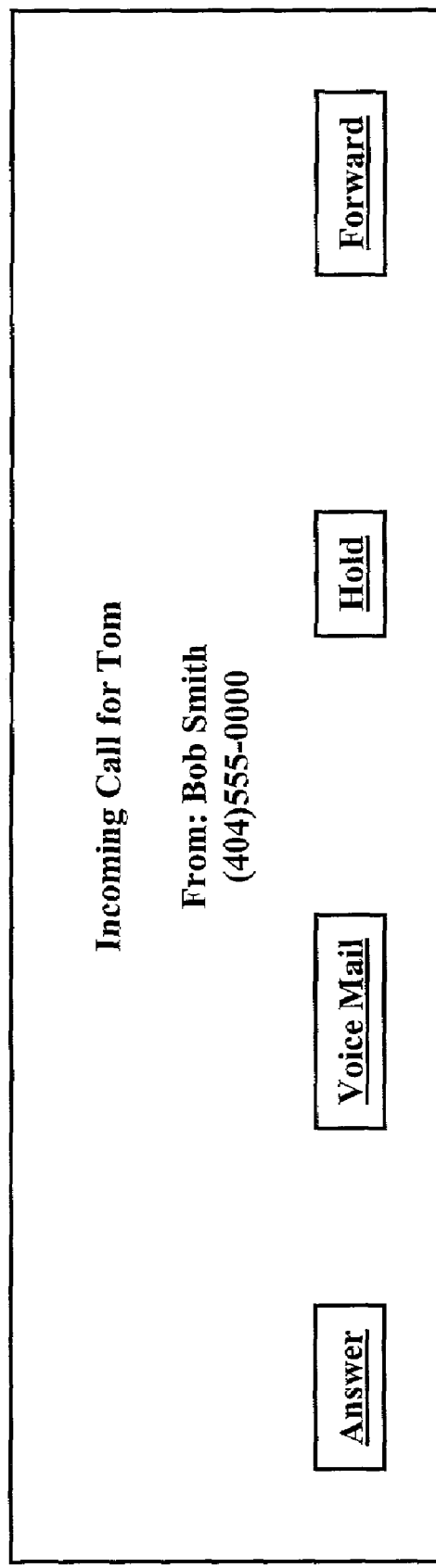
FIG. 3 is a schematic showing a typical prior art notification.

FIG. 3 is a schematic showing a typical prior art Internet Call-Waiting message notification 82. This prior art notification 82 is usually a "pop-up" graphical user interface (GUI) that appears on a video display of the computer system (shown as reference numeral 22 in FIG. 1). This prior art notification 82 is displayed whenever an incoming call is received. The prior art notification 82 often gives the user of the computer system 22 an option to accept the call, send the call to voice mail, hold the call, or forward the call. The call is processed according to the user's selection.

Figure 4:
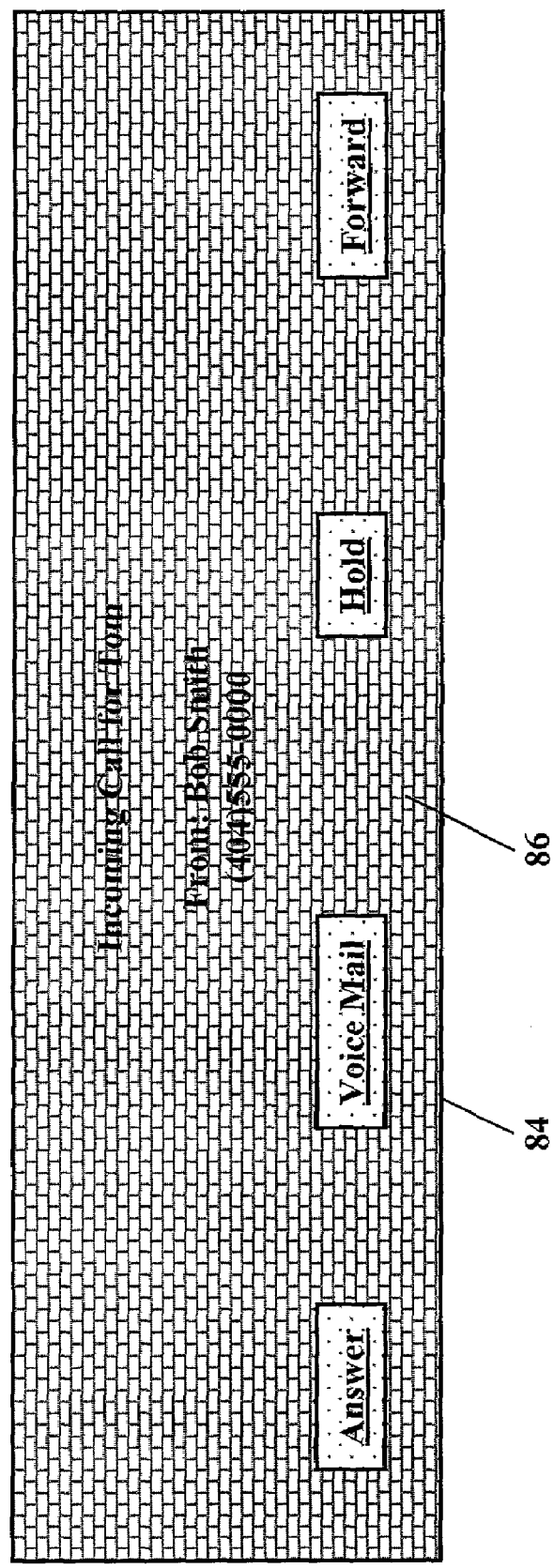
FIG. 4 is a schematic illustrating an enhanced Internet Call-Waiting message notification.

FIG. 4 is a schematic illustrating an enhanced Internet Call-Waiting message notification 84 according to the present invention. The Internet Call-Waiting Client Module (shown as reference numeral 20 in FIGS. 1 and 2) of the present invention, operating within the system memory device (shown as memory subsystem 24, flash memory 26, peripheral storage device 28 in FIG. 1) of the computer system (shown as reference numeral 22 in FIGS. 1 and 2), allows the user to select the content of an Internet Call-Waiting message. The user may, at a minimum, make changes to the graphical user interface (GUI) to create a desired appearance for the Internet Call-Waiting message notification 84. FIG. 4 shows the user/subscriber has made a change to the background wallpaper design 86 of the Internet Call-Waiting message notification 84.

Figure 5:
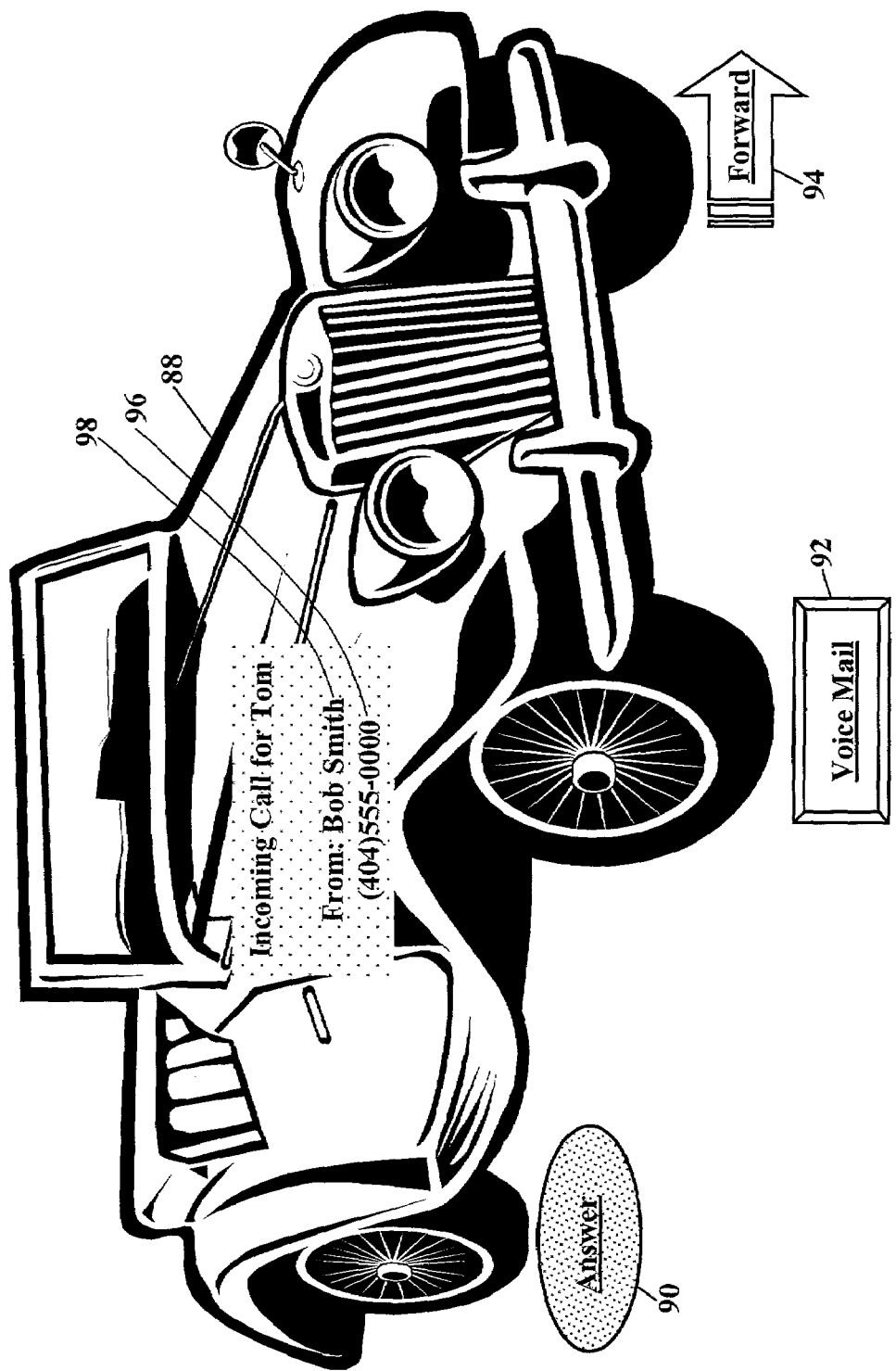
FIG. 5 is a schematic showing selected graphics accompanying an Internet Call-Waiting message.

FIG. 5, on the other hand, is a schematic showing the user may select graphics to accompany an Internet Call-Waiting message. FIG. 5 demonstrates that the user may be permitted to select from a wide variety of graphics files to personalize an Internet Call-Waiting message. Once the subscribing customer/user has made their selection, Internet Call-Waiting messages would then be presented according to the desired content. FIG. 5 shows the user/subscriber may select the graphic presented when an Internet Call-Waiting message is received (a car 88 represents any graphic the user/subscriber may select to personalize their Internet Call-Waiting message). The Internet Call-Waiting Client Module (shown as reference numeral 20 in FIGS. 1 and 2) may also allow the user/subscriber to select the style and location of controls 90. These controls 90 respond to user actions. These controls are typically buttons, dials, sliders, arrows, text fields, list boxes, and other objects or fields that accept user manipulations and actions. As FIG. 5 shows, the Internet Call-Waiting Client Module allows the user/subscriber select the style of the control (such as action button 92 and arrow 94). The Internet Call-Waiting Client Module also allows the user/subscriber to arrange the location of the controls 90, 92, and 94. The Internet Call-Waiting Client Module also allows the user/subscriber to select the style and location of the telephone number 96 and the listed name 98 of the calling station.

Figure 6:
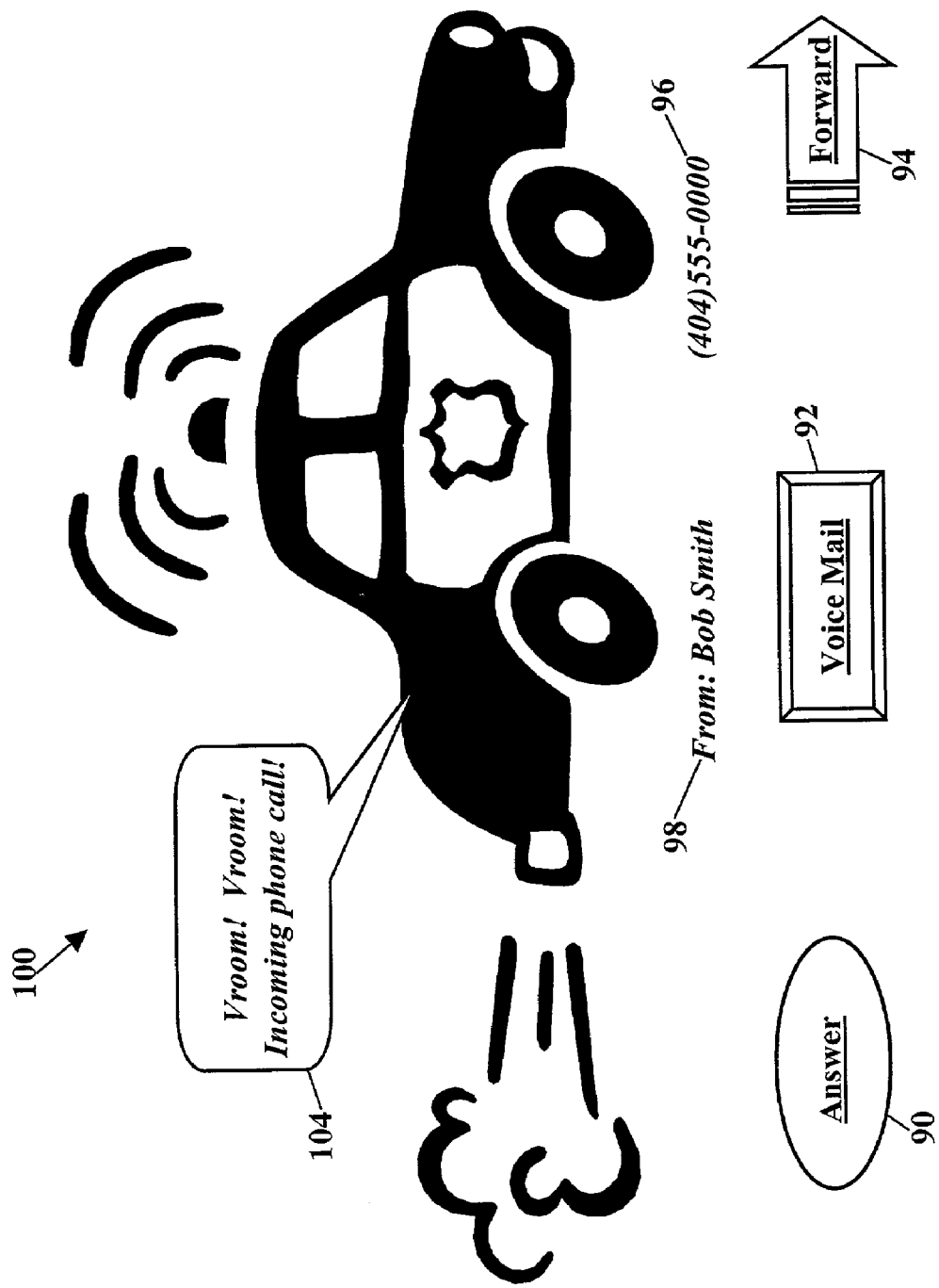
FIG. 6 is a schematic illustrating an animated Internet Call-Waiting message with sound content.

FIG. 6 is a schematic illustrating an animated Internet Call-Waiting message 100 with sound content. The Internet Call-Waiting Client Module allows the user/subscriber to select animation to accompany an Internet Call-Waiting message. FIG. 6 shows a police car 102 speeding from the left, with audio content 104 announcing the incoming call. The police car 102 and the audio content 104, again, represent any animation and audio content the user/subscriber may select to accompany the Internet Call-waiting message 100. FIG. 6 also shows the telephone number 96 and the listed name 98 of the calling station being "pulled" along with the animation. The Internet Call-Waiting Client Module, again, allows the user/subscriber select the style and location of the controls 90, 92, and 94. The Internet Call-Waiting Client Module also allows the user/subscriber to select the style and location of the telephone number 96 and the listed name 98 of the calling station.

Figure 7:
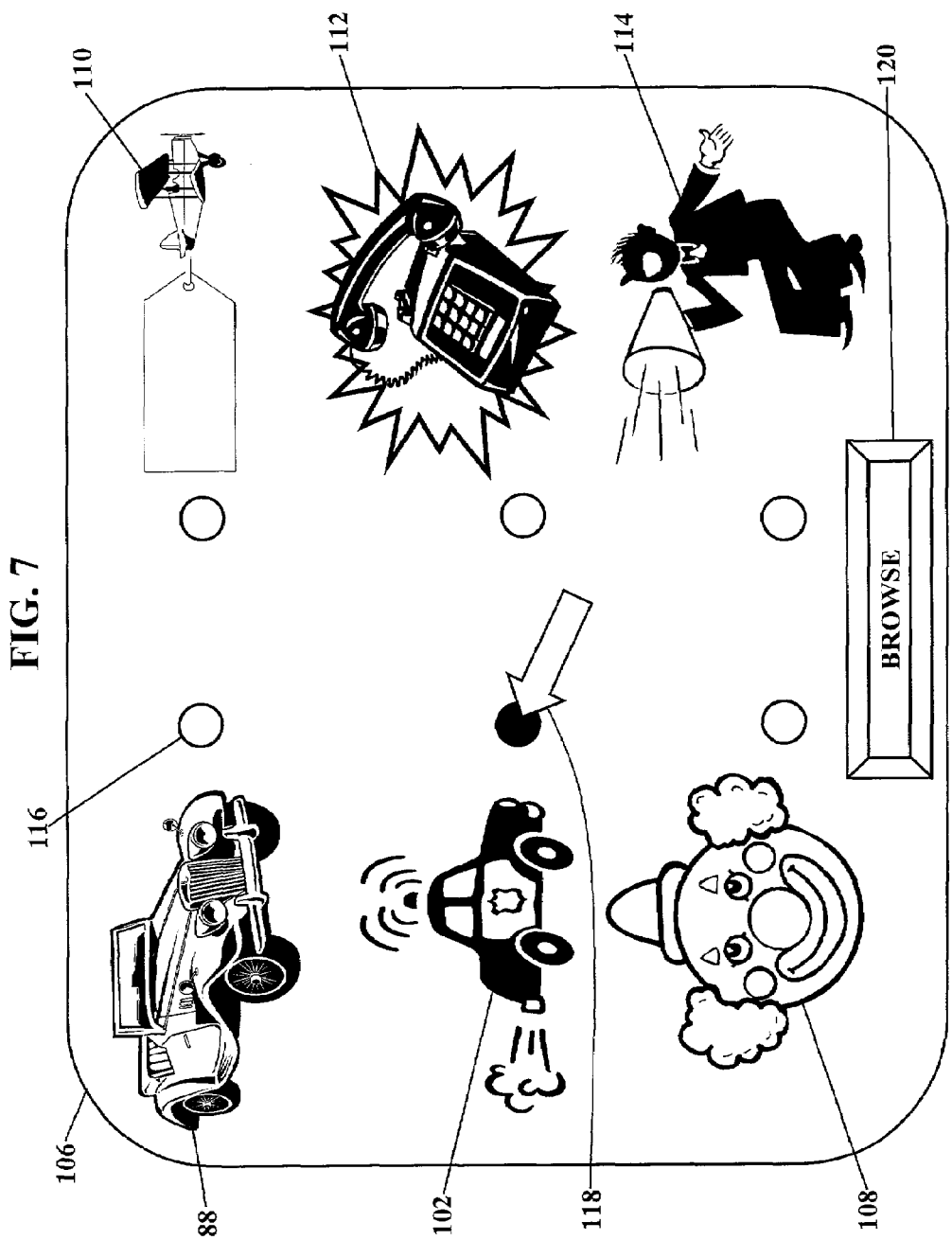
FIG. 7 is a schematic of a graphical user interface (GUI) for selecting the content of Internet Call-Waiting messages.

FIG. 7 is a schematic of a graphical user interface (GUI) for selecting the content of Internet Call-Waiting messages. The graphical user interface is presented as a menu 106 of content from which the user/subscriber may select. The menu 106 displays the available content and presents a corresponding control for the content. FIG. 7 shows the menu 106 including the car 88 and the animated police car 102. The menu 106 also shows other available options, such as a clown 108, an airplane 110, an animated ringing phone 112, and an animated shouting person 114. A corresponding toggle-click control 116 allows the user/subscriber to place a cursor 118 and to select and to de-select content. Each selection presented in the menu 106 could also include a sound file associated with the graphic or the animation. The Internet Call-Waiting Client Module also allows browsing a local memory device or the data network (shown as reference numeral 66 in FIG. 2) for additional graphic, animation, and sound content. A control button 120 would allow the user/subscriber to access local memory or a data network (such as the Internet distributed computing network) and download additional graphic, animation, and sound content files.

Figure 8:
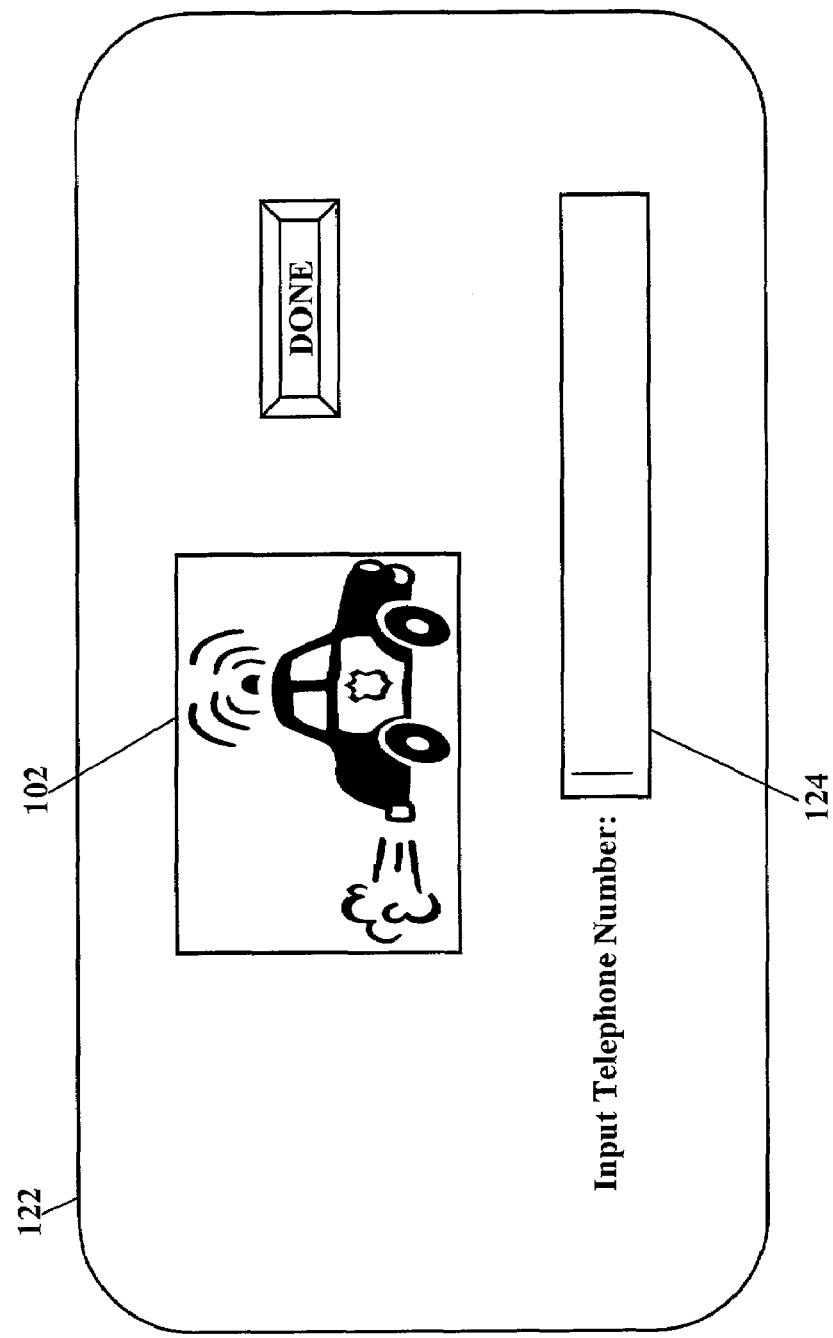
FIG. 8 is a schematic of another graphical user interface for associating content with telephone numbers.

FIG. 8 is a schematic of another graphical user interface 122 for associating content with telephone numbers. After the user/subscriber selects their desired content (such as the police car 102), the user/subscriber may also associate or match a telephone number with the content. The Internet Call-Waiting Client Module, for example, presents a telephone number data field 124. The user/subscriber enters the desired telephone number the desired content and clicks "DONE" or some other terminating control. Afterwards, the next time an Internet Call-Waiting message is received from the same telephone number, the desired content for that telephone number will accompany the Internet Call-waiting message. The Internet Call-Waiting Client Module, therefore, allows the user/subscriber to associate different content for different telephone numbers. Because the Internet Call-Waiting message includes the telephone number of the calling station (such as CallerID), the Internet Call-Waiting Client Module may retrieve the desired content associated with an incoming telephone number.

Associating graphic photo images is desirable. The user/subscriber could associate a digital photo with a telephone number. The user/subscriber, for example, could associate a digital photo of a caller with that caller's corresponding telephone number. The Internet Call-Waiting Client Module, therefore, creates a virtual picture phone where the digital photo of the caller is displayed when the Internet Call-Waiting message is presented. The Internet Call-Waiting Client Module also automatically scales the digital photo to match whatever GUI or field the user/subscriber has chosen.

The user may also associate content with groupings and with categories. The user, as previously mentioned, can associate content with a telephone number. The user, however, can also associate content with groups of telephone numbers and with categories of telephone numbers. The user, for example, could group together unrelated telephone numbers and associate content with the group. Unlisted telephone numbers, out-of-area telephone numbers, and other telephone numbers for which CallerID is unavailable, could be grouped together as "Private." The user could then associate content with this "Private" grouping. The user may also associate common content with a category of telephone numbers. Work-related telephone numbers, for example, could be categorized as "Business." All telephone numbers in this "Business" category could then have common content. The user, likewise, can associate content with "Family," "Personal," "kid's friends," "Mom's friends" and any other category of telephone numbers. The user could also associate digital photos and other graphic images to groupings and to categories.

The Internet Call-Waiting Client module can also interface with electronic address books. If the user maintains an electronic address book, the user can also associate graphics, animation, and sounds to the categories of telephone numbers maintained in the address book. Assume the user maintains an address book for a PALM® handheld organizer on the computer system (shown as reference numeral 22 in FIGS. 1 and 2) (PALM® is a registered trademark of Palm, Inc., 5470 Great America Parkway, Santa Clara, Calif. USA 95054, 408.878.9000). Because the PALM® organizer allows the user to categorize entries in the address book, the user can associate graphics, animation, and sounds with the categories in the address book. When the computer system (shown as reference numeral 22 in FIGS. 1 and 2) receives an Internet Call-Waiting message, the Internet Call-Waiting Client Module accesses the PALM® electronic address book. Because the Internet Call-Waiting message usually includes CallerID information, the Internet Call-Waiting Client Module searches the address book for the telephone number of the calling party. If the telephone number is categorized within the address book, the Internet Call-Waiting Client Module may then display the graphics, animation, and sounds associated with that category in the address book. So, if the user maintains a relative's telephone number in a "Family" category in the PALM® organizer, the Call-Waiting Client Module displays the content associated with the PALM® Organizer's "Family" category. The PALM® handheld organizer, of course, is only an example of an electronic address book. The Internet Call-Waiting Client Module can interface with any electronic address book the user wishes to locally maintain on the computer system and/or remotely maintain on the data network (such as on a server communicating with the World Wide Web).

Figure 9:
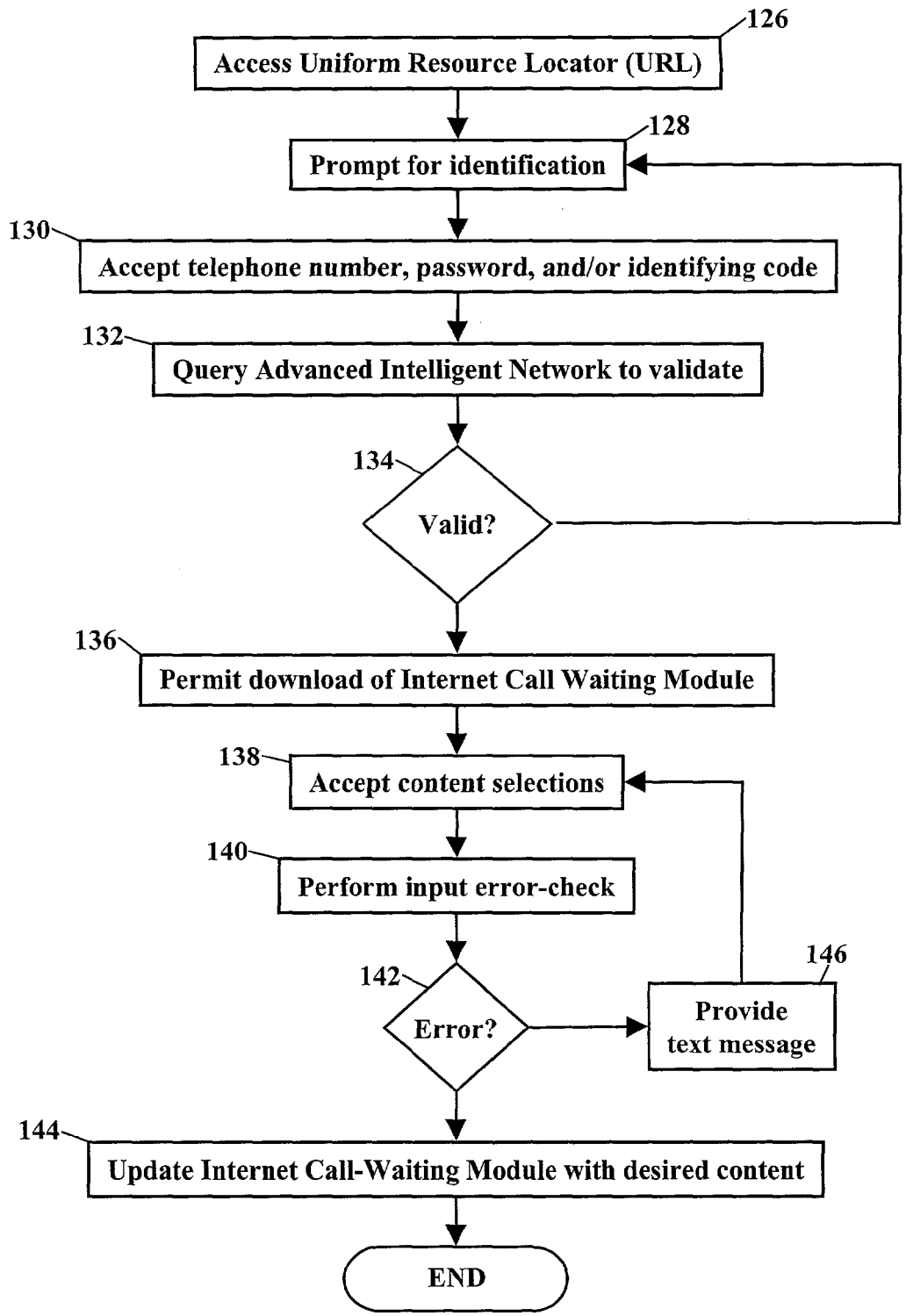
FIG. 9 is a flowchart describing one embodiment of providing content for Internet Call-Waiting messages.

FIG. 9 is a flowchart describing one embodiment of providing content for Internet Call-Waiting messages. A subscriber accesses a Uniform Resource Locator (URL) (Block 126) on the data network (shown as reference numeral 66 in FIG. 2). The subscriber would access this URL to update their Internet Call-Waiting service. The subscriber is then prompted for identification (Block 128). The subscriber's telephone number and password or identifying code is then accepted (Block 130). The Advanced Intelligent Network is then queried to validate the subscriber (Block 132). If the subscriber is validated (Block 134), the subscriber is permitted to download the Internet Call Waiting Module (Block 136). The Internet Call-Waiting Client Module could include a predefined selection of content, and this content is visually or audibly presented to the subscriber. The subscriber is permitted to make their desired content selections (Block 138). Input error-checking is performed to ensure accuracy (Block 140). If no error is detected (Block 142), the Internet Call-Waiting Client Module is updated with the subscriber's desired content (Block 144). If an error is detected in the subscriber's selection, a text feedback message is provided (Block 146) and the subscriber is returned to re-select content (Block 138).

Figure 10:
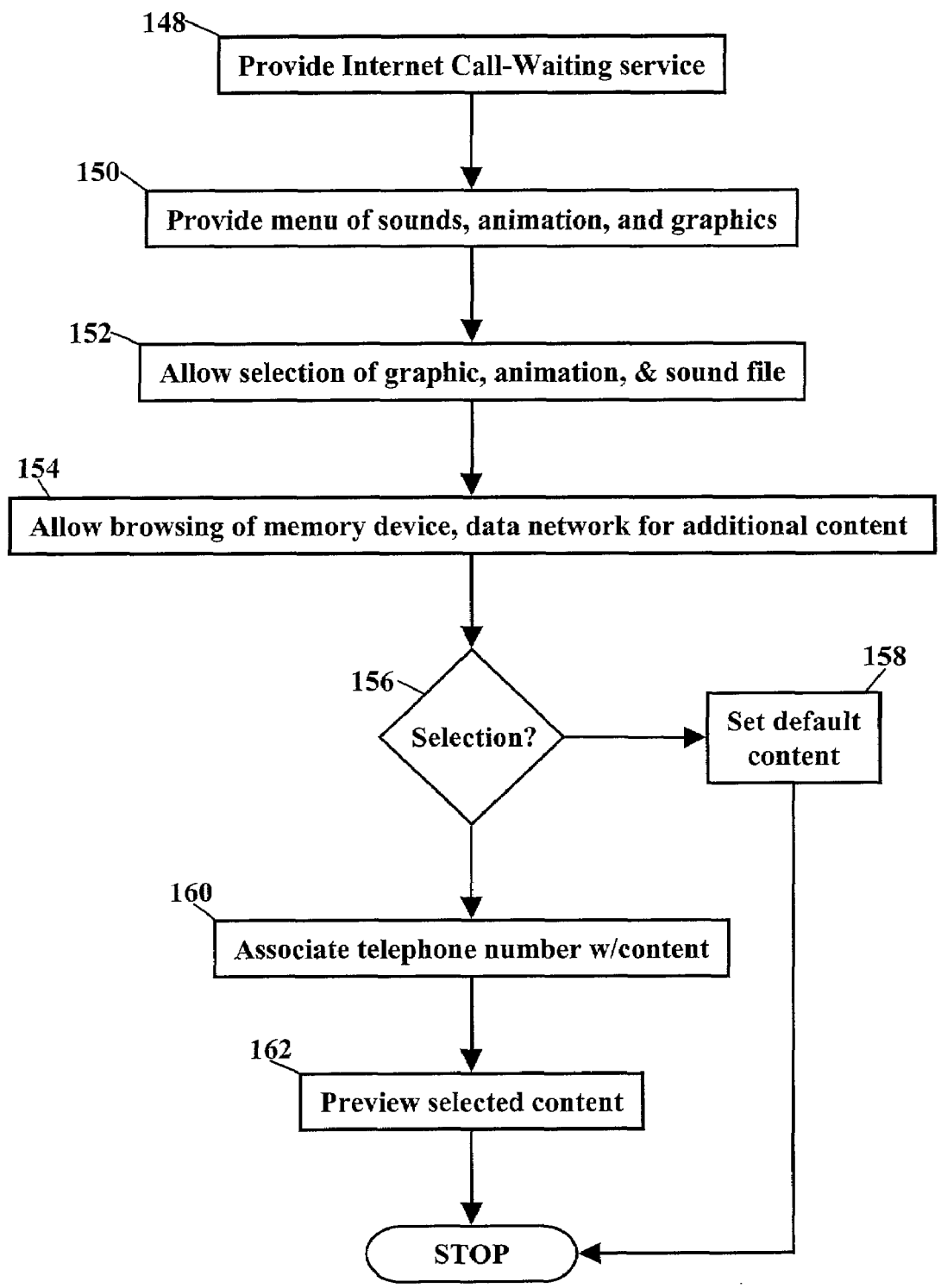
FIG. 10 is a flowchart describing another embodiment of providing content for Internet Call-Waiting messages.

FIG. 10 is a flowchart describing another embodiment of providing content for Internet Call-Waiting messages. Internet Call-Waiting service is provided to a customer (Block 148). The customer is provided with a menu of sounds, animation, and graphics to accompany a Internet Call-Waiting message from the Internet Call-Waiting service (Block 150). The customer is allowed to select at least one of a graphic file, an animation file, and a sound file to accompany the Internet Call-Waiting message (Block 152). The customer may even browse a local computer's memory device or a data network (such as the Internet distributed computing network) for additional content (Block 154). If the customer has not made a content selection (Block 156), defaulting animation, graphic, and sound content could be set (Block 158). If the customer has selected content, the customer may also be permitted to associate a telephone number with the selected content (Block 160). A preview of the customer's selection may be provided (Block 162), thus allowing the customer to see and hear the selected content in a simulated Internet Call-Waiting message.

FIG. 11 is a flowchart describing yet another embodiment of providing content to accompany an Internet Call-Waiting message. The Internet Call-Waiting message is received (Block 164) and includes information representing a telephone number of a calling party. This embodiment then searches for content associated with the telephone number of the calling party (Block 166). Because content may be locally and remotely accessed, this embodiment searches local memory and searches the data network (such as the World Wide Web).

Local computer memory is searched for the telephone number of the calling party (Block 168). This search would also include an address book stored in the memory. If the telephone number is found, this embodiment retrieves the content associated with the telephone number (Block 170). The content could be associated with a group having the telephone number, with a category having the telephone number, or with an address book having the telephone number. The content is then audibly and/or visually presented (Block 172). If no content is found, then default content is retrieved (Block 174) and presented (Block 172).

The data network may also be searched for content. A query may be sent to the data network (Block 176). The query requests any content associated with the telephone number of the calling party. The query could also request content associated with an entry in an address book maintained on a server in the data network. If content is received (Block 178), the content is visually/audibly presented (Block 172). If no content is retrieved, default content is retrieved (Block 174) and presented (Block 172).

The Internet Call-Waiting Client Module (shown as reference numeral 20 in FIG. 1) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the Internet Call-Waiting Client Module to be easily disseminated. A computer program product for selecting the content of Internet Call-Waiting messages comprises the computer-readable medium and the Internet Call-Waiting Client Module. The Internet Call-Waiting Client Module is stored on the computer-readable medium.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method, comprising:
generating an Internet Call-Waiting message when a called station receives a telephone call while having an established connection to a data network;
searching an electronic address book for a telephone number of a calling party;
retrieving a category associated with the telephone number in the electronic address book;
retrieving content selected by a customer and associated with the category to accompany the Internet Call-Waiting message;
retrieving a customer-selected style and a customer selected location of a control that accompanies the Internet Call-Waiting message, the control responding to the customer's action; and
sending the Internet Call-Waiting message to an address associated with the called station.

2. A method according to claim 1, further comprising retrieving animation and sound to accompany the Internet Call-Waiting message.

3. A method according to claim 1, further comprising setting default content to accompany the Internet Call-Waiting message.

4. A method according to claim 1, further comprising routing a simulated Internet Call-Waiting message including the customer's selected content, the simulated Internet Call-Waiting message providing a preview of the customer's selected content.

5. A method according to claim 1, further comprising providing a menu of graphics and animation from which the customer selects desired content to accompany the Internet Call-Waiting message.

6. A method according to claim 1, wherein if a telephone number of the calling party is unavailable, then further comprising retrieving common content associated with telephone numbers for which Caller identification is unavailable.

7. A method according to claim 1, wherein if the telephone number of the calling party is not found in the address book, then retrieving a grouping associated with the telephone number, retrieving common content associated with the grouping, and routing the common content to accompany the Internet Call-Waiting message.

8. A method, comprising:
searching an electronic address book for a telephone number of a calling party;

retrieving a category associated with the telephone number in the electronic address book;

retrieving content associated with the category to accompany an Internet Call-Waiting message;

retrieving a customer-selected style and a customer selected location of a control that accompanies the Internet Call-Waiting message, the control responding to the customer's action; and routing a simulated Internet Call-Waiting message to an address associated with the called station, the simulated Internet Call-waiting message providing a preview of the content that will accompany the Internet Call-Waiting message when the called station receives a telephone call while having an established connection to a data network.

9. A method according to claim 8, wherein the step of retrieving the content comprises retrieving at least one of a graphic, an animation, and a sound to accompany the Internet Call-Waiting message.

10. A method according to claim 8, wherein if the telephone number of the calling party is unavailable, ten further comprising retrieving common content associated with telephone numbers for which Caller identification is unavailable.

11. A method according to claim 8, wherein if the telephone number of the calling party is not found in the address book, then retrieving a grouping associated with the telephone number, retrieving common content associated with the grouping, and routing the common content to accompany the Internet Call-Waiting message.

12. A method according to claim 8, further comprising retrieving common content associated with at least one of a group of telephone numbers and a category of telephone numbers.

13. A system, comprising:

a processor communicating with an Internet Call-Waiting Client Module stored in memory, the processor generating an Internet Call-Waiting message when a called station receives a telephone call while having an established connection to a data network, the processor searching an electronic address book for a telephone number of a calling party, the processor retrieving a category associated with the telephone number in the electronic address book, the processor retrieving content selected by a customer and associated with the category to accompany the Internet Call-Waiting message, the processor retrieving a customer-selected style and a customer selected location of a control that accompanies the Internet Call-Waiting message, the control responding to the customer's action, and the processor sending the Internet Call-Waiting message to an address associated with the called station.

14. A system according to claim 13, wherein the processor retrieves animation and sound to accompany the Internet Call-Waiting message.

15. A system according to claim 13, wherein the processor retrieves default content to accompany the Internet Call-Waiting message.

16. A system according to claim 13, wherein the processor retrieves a menu of graphics and animation from which the customer selects desired content to accompany the Internet Call-Waiting message.

17. A system according to claim 13, wherein if a telephone number of the calling party is unavailable, then the processor retrieves common content associated with telephone numbers for which Caller identification is unavailable.

18. A system according to claim 13, wherein if the telephone number of the calling party is not found in the address book, then the processor retrieves a grouping associated with the telephone number, retrieves common content associated with the grouping, and routes the common content to accompany the Internet Call-Waiting message.

19. A system according to claim 13, wherein the processor retrieves common content associated with telephone numbers.

* * * * *